(12) United States Patent
Couleur et al.

(10) Patent No.: US 9,369,043 B2
(45) Date of Patent: Jun. 14, 2016

(54) PHASE CURRENT BALANCING FOR MULTIPHASE CONVERTERS

(71) Applicant: TEXAS INSTRUMENTS INCORPORATED, Dallas, TX (US)

(72) Inventors: Michael Couleur, Munich (DE); Stefan Herzer, Freising (DE); Nicola Florio, Munich (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 563 days.

(21) Appl. No.: 13/658,331

(22) Filed: Oct. 23, 2012

(65) Prior Publication Data
US 2014/0111179 A1 Apr. 24, 2014

(51) Int. Cl.
*G06F 3/08* (2006.01)
*H02M 3/158* (2006.01)

(52) U.S. Cl.
CPC .................................. *H02M 3/1584* (2013.01)

(58) Field of Classification Search
CPC .................... H02M 3/1584; H02M 2003/1586
USPC ........................................................ 323/272
See application file for complete search history.

(56) References Cited

U.S. PATENT DOCUMENTS

| | | | |
|---|---|---|---|
| 2004/0008011 A1* | 1/2004 | Wang et al. | 323/213 |
| 2007/0200538 A1* | 8/2007 | Tang et al. | 323/237 |
| 2007/0241733 A1* | 10/2007 | Chen et al. | 323/288 |
| 2009/0167080 A1* | 7/2009 | Carpenter et al. | 307/14 |

* cited by examiner

*Primary Examiner* — Jue Zhang
(74) *Attorney, Agent, or Firm* — William B. Kempler; Frank D. Cimino

(57) ABSTRACT

A DC-DC converter includes a first differential voltage sensor to detect a first inductor current by sensing a first differential voltage across a first power stage of the DC-DC converter. A second differential voltage sensor detects a second inductor current by sensing a second differential voltage across a second power stage of the DC-DC converter. An integrator stage combines the first differential voltage from the first power stage and the second differential voltage from the second power stage to generate a compensation signal to adjust current balancing for the DC-DC converter.

17 Claims, 3 Drawing Sheets

PHASE CURRENT BALANCING FOR MULTIPHASE CONVERTERS

TECHNICAL FIELD

This disclosure relates to a systems and methods to provide phase current balancing for multiphase DC-DC converters.

BACKGROUND

Voltage converters such as DC-DC converters come in two forms. When an input voltage is to be stepped up in voltage by the converter, a boost or step-up configuration is provided. When the input voltage needs to be stepped down to a lower voltage by the converter, a buck converter is provided. Thus, a buck converter is a step-down DC-DC converter. Its design is similar to the step-up boost converter, and like the boost converter, it is a switched-mode power supply that employs switches (e.g., a transistor and a diode), an inductor and a capacitor. The most straight-forward manner to reduce the voltage of a DC supply is to use a linear regulator, but linear regulators waste energy as they operate by dissipating excess power as heat. Switching converters such as buck converters, on the other hand, can be remarkably efficient (95% or higher for integrated circuits), making them useful for tasks such as converting the main voltage in a computer (e.g., 12 V in a desktop, 12-24 V in a laptop) down to the 0.8-1.8 volts needed by the processor.

Another type of step-down or buck converter is a multiphase converter which is used to address high load current situations. By using two inductors in parallel to generate the output voltage instead of a single inductor, designers can reduce input and output ripple as well as mitigate inductor power losses while increasing the load transient response of the converter. When two inductors are employed as opposed to single inductor designs, two parallel paths within driving circuitry need to be maintained thus requiring some type of current balancing between the paths. To realize additional current balancing, means must be provided to measure current flowing through each inductor. Sensing current in a switching converter is not very practical, however, since it is not possible for a single device to monitor continuous load current and across which a DC sense device could be operated effectively. Methods for sampling a voltage on a replica stage power FET to determine loop currents are sometimes employed, yet such techniques are inaccurate, noise sensitive, and slow, thus limiting performance of the overall current balancing loop.

SUMMARY

In one example, a DC-DC converter includes a first differential voltage sensor to detect a first inductor current by sensing a first differential voltage across a first power stage of the DC-DC converter. A second differential voltage sensor detects a second inductor current by sensing a second differential voltage across a second power stage of the DC-DC converter. An integrator stage combines the first differential voltage from the first power stage and the second differential voltage from the second power stage to generate a compensation signal to adjust current balancing for the DC-DC converter.

In another example, a method includes generating a first output current based on a first differential voltage from a first power stage that drives a first inductor of a DC-DC converter, wherein the first differential voltage is representative of the current flowing though the first inductor. The method includes generating a second output current based on a second differential voltage from a second power stage that drives a second inductor of the DC-DC converter, wherein the second differential voltage is representative of the current flowing though the second inductor. The method also includes integrating the first output current and second output current into a compensation signal to adjust current balancing in the DC-DC converter.

In yet another example, a controller for a DC-DC converter includes a first differential voltage sensor to detect a first inductor current by sensing a first differential voltage across a first power stage of the DC-DC converter. A first transconductance amplifier receives the first differential voltage as input generates a first output current that represents the first differential voltage across the first power stage of the DC-DC converter. A second differential voltage sensor detects a second inductor current by sensing a second differential voltage across a second power stage of the DC-DC converter. A second transconductance amplifier that receives the second differential voltage as input generates a second output current that represents the second differential voltage across the second power stage of the DC-DC converter. An integrator stage combines the first output current from the first transconductance amplifier and the second output current from the second transconductance amplifier to generate a compensation signal to adjust current balancing for the DC-DC converter.

DETAILED DESCRIPTION

Figure 1:
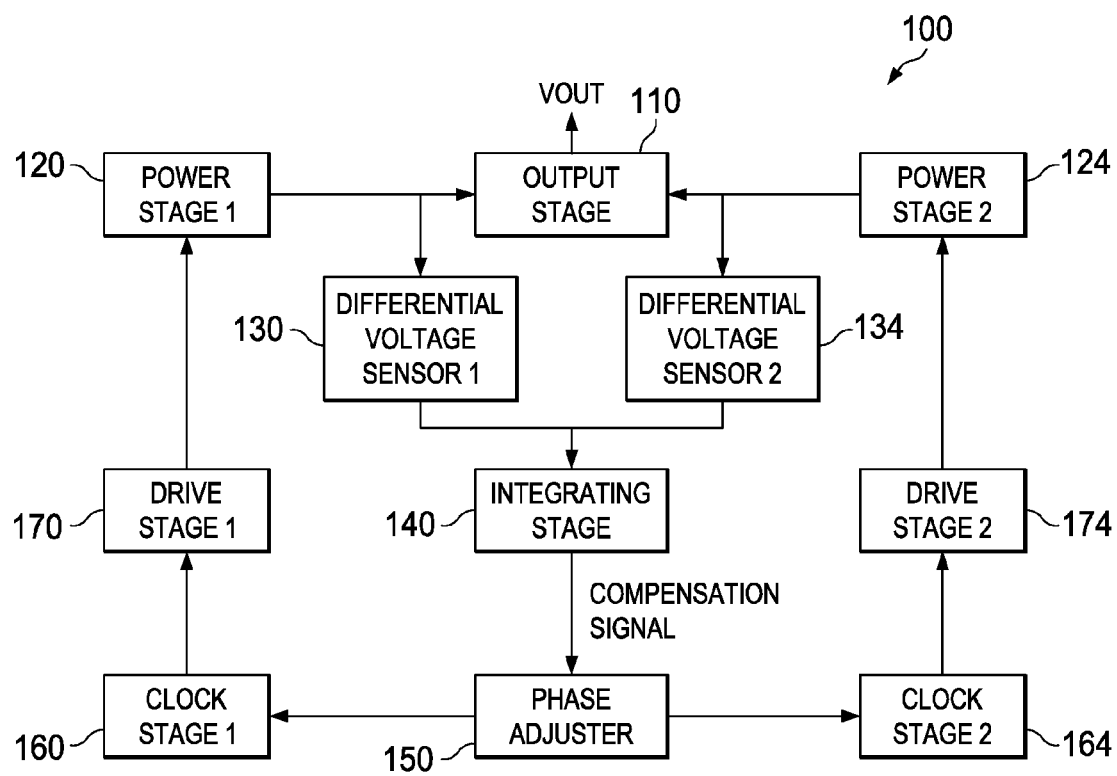
FIG. 1 illustrates an example of a multiphase DC-DC converter that employs differential voltage sensors to facilitate current balancing in the converter.

FIG. 1 illustrates an example of a multiphase DC-DC converter 100 that employs differential voltage sensors to facilitate current balancing in the converter. The DC-DC converter 100 employs multiple phases (e.g., stages being driven off different clocks) to drive an output stage 110. The output stage 110 includes at least two inductors (e.g., a first and second inductor) to generate an output voltage VOUT that are switched by a first power stage 120 and a second power stage 124. In order to facilitate desired circuit operations of the DC-DC converter 100, current through the inductors in the output stage 110 should be sensed in order that current can be balanced between stages and phases driving the respective inductors. Past sensing techniques have relied on replicating transistors in the power stages that model current in the inductors. Such techniques are inaccurate and costly to fabricate however. Direct sensing of the inductor current is also impractical since continuous load current is difficult to monitor.

The DC-DC converter 100 employs indirect methods of detecting inductor current and ultimately correcting current imbalances between the inductors and/or circuits driving the inductors. The methods are indirect since current through the inductors is not directly monitored yet voltages at the output of the power stages 120 and 124 are sensed to determine and derive such current. A first differential voltage sensor 130 can be employed to detect a first inductor current by sensing a first differential voltage across the first power stage 120 of the DC-DC converter 100. A second differential voltage sensor 134 can be employed to detect a second inductor current by sensing a second differential voltage across the second power stage of the DC-DC converter 100. An integrator stage 140 (e.g., integrating capacitor) combines the first differential voltage from the first power stage 120 and the second differential voltage from the second power stage 124 to generate a compensation signal to adjust current balancing for the DC-DC converter.

As shown, the compensation signal can be applied to a phase adjuster 150 that adjusts clock duty cycles for a first clock stage 160 and a second clock stage 164, wherein each stage is driven by different clock phases (e.g., 180 degrees out of phase clocks). By adjusting the clock duty cycles of the clock stages 160 and 164, current balancing in the DC-DC converter 100 can be adjusted and balanced. Output from the clock stages 160 and 164 is employed to control a first drive stage 170 and a second drive stage 174. The outputs from the drive stages 170 and 174 are then employed to drive the power stages 120 and 124, respectively.

The indirect differential voltage sensing described herein representing inductor current of a multiphase converter can be applied to substantially any type of DC-DC converter that employs multiple inductors, current balancing loops, and is utilized to convert one DC voltage to another DC value. Thus, in one example, the DC-DC converter 100 can be configured as a step-up converter or in another example the DC-DC converter can be configured as a step-down converter. The first power stage 120 and the second power stage 124 can include switching transistor pairs having an resistance drain to source (RDS) ON value that is employed to sense the first differential voltage of the first power stage and the second differential voltage of the second power stage. The first differential voltage and the second differential voltage can be sensed according to a voltage DeltaV, wherein DeltaV is about equal to RDS ON average*Iload_phase. The circuit locations for sensing DeltaV will be illustrated and described below with respect to FIG. 2.

A first resistor/capacitor filter (illustrated below in FIG. 2) at the output of the first power stage 120 and a second resistor/capacitor filter at the output of the second power stage 124 can be employed to filter the voltage DeltaV for the first power stage and the voltage DeltaV for the second power stage. A first transconductance amplifier provided with the first differential voltage sensor 130 generates a first output current representative of the voltage DeltaV for the first power stage 120 and a second transconductance amplifier provided with the second differential voltage sensor 134 generates a second output current representative of the voltage DeltaV for the second power stage 124. The drive stage 170 can include a first comparator to generate a first pulse width modulated signal at an input to the first transconductance amplifier, wherein the first pulse width modulated signal can be generated from a first phase clock and a first error signal applied to the first comparator. Similarly, a second comparator can be employed to generate a second pulse width modulated signal at an input to the second transconductance amplifier, the second pulse width modulated signal generated from a second phase clock and a second error signal applied to the second comparator.

Additional filtering can also be applied to the first and second pulse width modulated signals. This can include a third resistor/capacitor filter to filter the first pulse width modulated signal and a fourth resistor/capacitor filter to filter the second pulse width modulated signal. An integrating capacitor can be employed in the integrating stage 140 to generate the compensation signal from the combined output of the first transconductance amplifier and the second transconductance amplifier, wherein the compensation signal represents current imbalances between phases of the DC-DC converter 100.

A third transconductance amplifier can be provided in the phase adjuster 150 to generate phase adjustment signals from the compensation signal and a reference voltage applied to an input of the third transconductance amplifier, wherein the phase adjustment signals can be employed to adjust current imbalances in the DC-DC converter 100 by adjusting clock duty cycles of the clock stages 160 and 164. Various example components described herein for the respective stages and sensors will be illustrated and described below with respect to FIG. 2. It is noted that the examples described herein can be provided via different circuit implementations. For instance, in one example a resistor/capacitor filter could be employed, or in another example a switched capacitor filter could be employed. Similarly, in some examples, transconductance amplifiers may be employed and in other examples, voltage-controlled operational amplifiers can be employed. In some cases, field effect transistors can be employed and in other cases junction transistors employed. Some control components can be employed as discrete implementations such as a comparator comparing a reference voltage to a control signal and in other examples, controllers could be employed to monitor reference voltages and generate control signals within the DC-DC converter 100.

Figure 2:
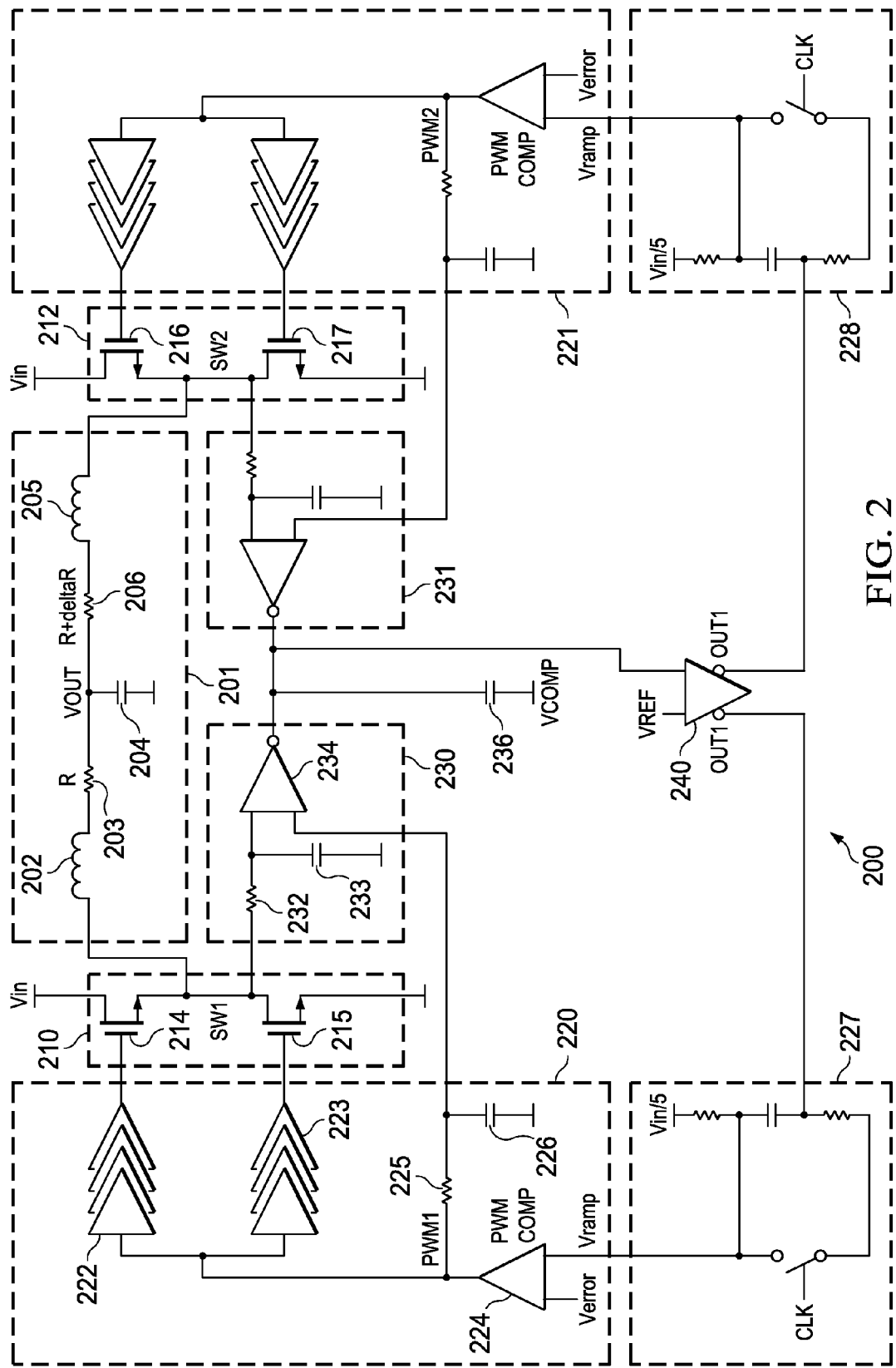
FIG. 2 illustrates an example DC/DC converter circuit that employs differential voltage sensors to facilitate current balancing in the converter.

FIG. 2 illustrates an example DC/DC converter circuit 200 that employs differential voltage sensors to facilitate current balancing in the converter. Various stages of the circuit 200 will be identified and correlated to the DC-DC converter depicted in FIG. 1. The circuit 200 includes an output stage 201 (similar to output stage 110 of FIG. 1) having a first inductor 202 in series with a resistor 203 and driving an output capacitor 204 that filters VOUT. Also driving the output capacitor 204 is a second inductor 205 in series with a resistor 206. The output stage 201 is driven by a first power stage 210 (similar to first power stage 120 of FIG. 1) driving the first inductor 202 and a second power stage 212 (similar to the second power stage 124 of FIG. 1) driving the second inductor 205. The first power stage 210 includes FET's 214 and 215 whereas the second power stage 212 includes FET's 216 and 217.

The first power stage 210 is driven from a first driver stage 220 (similar to first driver stage 170 of FIG. 1) and a second driver stage 221 (similar to second driver stage 174 of FIG. 1) is provided to drive the second power stage 212. For the purposes of brevity, only those components associated with the first driver stage 220 are described as the components associated with the second driver stage mirror those of the first. The first driver stage 220 includes serial amplifiers 222 and 223 to drive FET's 214 and 215, wherein multiple amplifier symbols represents multiple amplifier stages. It is noted that a single amplifier stage can be employed at 222 and 223, however.

The amplifiers 222 and 223 are driven from a pulse width modulator (PWM) comparator 224 which generates an output PWM1 that is filtered by a resistor 225 and capacitor 226. One input of the PWM comparator 224 is driven from a ramp signal VRAMP from a first clock stage 227 (similar to first clock stage 160 of FIG. 1). As shown, a second clock stage 228 (similar to second clock stage 164 of FIG. 1) is provided to drive the second driver stage 221 which drives the second power stage 212.

Output from each of the power stages 210 and 212 is sensed from a first differential voltage sensor 230 (similar to first differential voltage sensor 130 of FIG. 1) and a second differential voltage sensor 231 (similar to second differential voltage sensor 134 of FIG. 1) respectively. Each of the sensors 230 and 231 can include a resistor and capacitor filter such as shown at 232 and 233 that feed a sensed voltage from the power stage to a transconductance amplifier such as shown at 234, wherein circle symbols at the outputs of the transconductance amplifier 234 represent a voltage to current conversion. Current output from the transconductance amplifiers of the first sensor 230 and the second sensor 232 is fed to an integrating stage 235 represented by capacitor 236. Compensation output from the integrating stage 235 is fed to a third transconductance amplifier 240 operating as a phase adjuster described as phase adjuster 150 of FIG. 1. Output from the transconductance amplifier 240 is employed to adjust a ramp duty cycle to the clock stages 227 and 228, respectively which ultimately controls current balancing in the DC-DC converter circuit 200. As shown, a reference voltage VREF is compared with output from the integrating stage 235 to generate phase clock adjustments to the clock stages 227 and 228. Output from the PWM comparator 224 is generated from a converter error signal and a ramp signal VRAMP generated from the clock stage 227.

The circuit 200 provides a current sensing method that does not directly attempt to sense the phase current load but rather sensing the average differential voltage across the power stage 210 and 212 of each phase. Such differential voltage can be considered an image of the phase current load obeying the following equation: DeltaV=rdson_average*Iload_phase; where DeltaV is the average differential voltage across the phase power stage 210 or 212, rdson_average is the time average impedance of the power stage looking into the SW1 or SW2 pin of the power stage, and Iload_phase is the phase load current. As rdson_average is the ON resistance of the phase power FET which is generally one of the largest devices in the circuit 200, wherein the matching between these different rdson_average values is a suitable matching (parameters matched within a given threshold) achievable in the circuit (e.g., FET's having matched parameters fabricated in similar areas of a wafer).

As the rdson_average of all phases is matched, balancing is then provided the for deltaV voltage of each phase in order to match the current flowing through each phase. The PWM signal (shown as PWM1 and PWM2) before the power stage can be RC filtered for each phase yielding the signals called PWM1 (phase 1) and PWM2 (phase 2). The SW signal after the power stage can also be RC filtered for each phase providing the signals SW1 (phase 1) and SW2 (phase 2).

Two integrators (one in stage 230 and one in stage 231) can be employed to integrate input signals PWM1-SW1 and SW2-PWM2. The outputs of both integrators can be fed on to the same integrating capacitor 236. The capacitor voltage can be referred to as compensation signal VCOMP. The VCOMP signal can be compared by means of a differential transconductance amplifier (OTA) 240 to a fixed reference voltage called VREF. The output of the differential OTA 240 can be referred to as OUT1 and OUT2.

The output current OUT1 modifies the duty cycle of the first phase and the output current OUT2 modifies the duty cycle of the second phase. If VCOMP>VREF, then the OUT1 output current of the OTA 240 decreases the duty cycle of the first phase, and thus decreasing the current flowing through the first phase until the equilibrium is reached and the currents are balanced. If VCOMP<VREF, then the OUT2 output current of the OTA decreases the duty cycle of the second phase, and thus decreasing the current flowing through the second phase until the equilibrium is reached and the currents are balanced.

Figure 3:
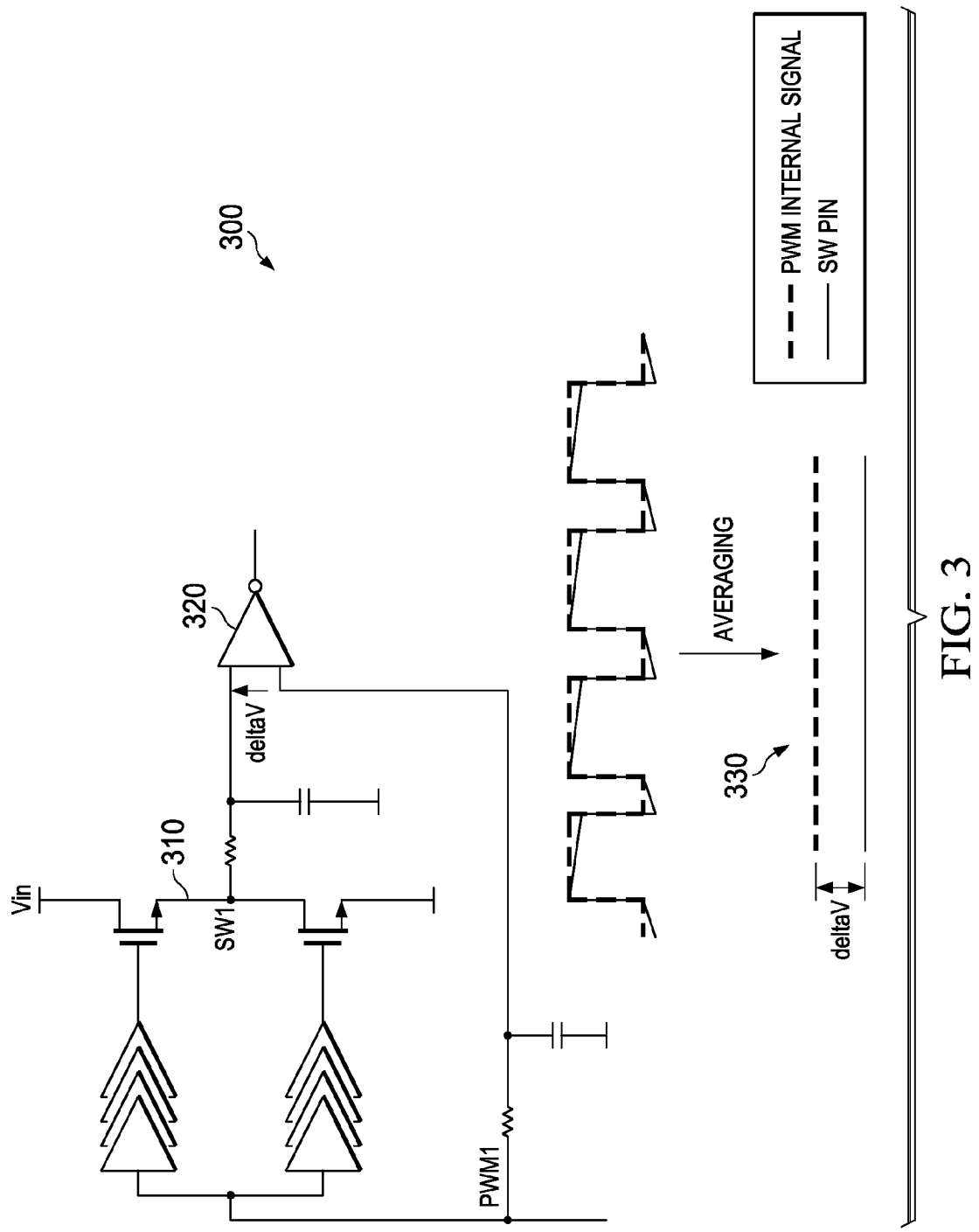
FIG. 3 illustrates an example signal diagram illustrating signals that are sampled to generate differential voltages representative of inductor loop currents.

FIG. 3 illustrates an example signal diagram 300 illustrating signals that are sampled to generate differential voltages representative of inductor loop currents. The diagram 300 illustrates where the DeltaV signal described above with respect to FIGS. 1 and 2 is measured. As shown, an SW1 signal 310 at the output of a power stage is RC filtered and supplied to a transconductance amplifier 320. The other input to the transconductance amplifier 320 is the filtered PWM1 signal from the driver stage described above. As shown in the diagram 300, DeltaV such as illustrated at 330 is the voltage appearing across the inputs to the transconductance amplifier 320 and provides an indirect measurement of the current flowing in a respective phase of the multiphase converter.

Figure 4:
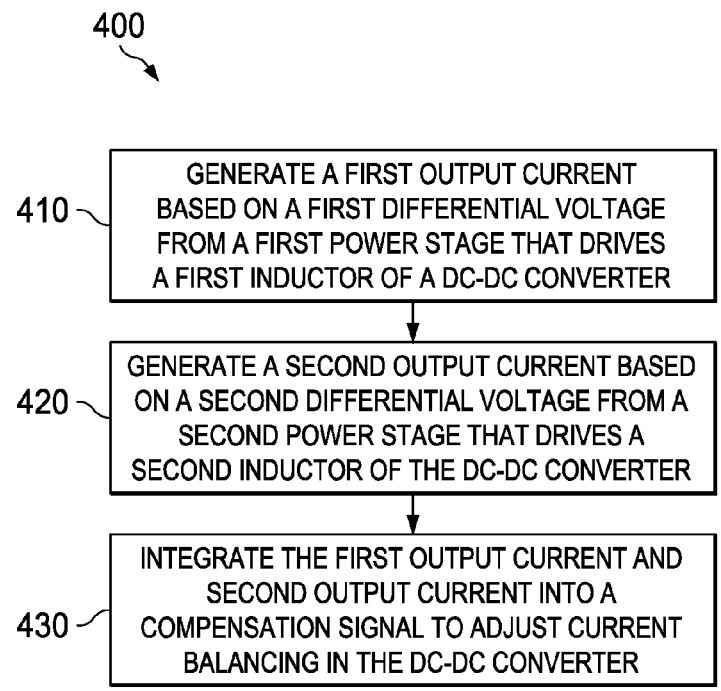
FIG. 4 illustrates an example method to facilitate current balancing of a multiphase DC/DC converter.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 4 illustrates an example method 400 to facilitate current balancing of a multiphase DC/DC converter. At 410, the method 400 includes generating a first output current (e.g., via amplifier 234 of FIG. 2) based on a first differential voltage from a first power stage (e.g., power stage 210 of FIG. 2) that drives a first inductor of a DC-DC converter, wherein the first differential voltage is representative of the current flowing though the first inductor. At 410, the method 400 includes generating a second output current by sensing a second differential voltage from a second power stage (e.g., stage 212 of FIG. 2) that drives a second inductor of the DC-DC converter, wherein the second differential voltage is representative of the current flowing though the second inductor. At 430, the method 400 includes integratating the first output current and second output current into a compensation signal to adjust current balancing in the DC-DC converter.

Although not shown, the method 400 can also include providing switching transistor pairs having an RDS ON value that is employed to sense the first differential voltage of the first power stage and the second differential voltage of the second power stage. This includes sensing the first differential voltage and the second differential voltage according to a voltage DeltaV, wherein DeltaV is about equal to RDS ON average*Iload_phase. The method 400 can also include filtering the output of the first power stage and the output of the second power stage to filter the voltage DeltaV for the first power stage and DeltaV for the second power stage. This can also include generating a first output current representative of the voltage DeltaV for the first power stage and a second a second output current representative of the voltage DeltaV for the second power stage.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A DC-DC converter, comprising a plurality of power stages:
a first differential voltage sensor to detect a first inductor current by sensing a first differential voltage between a first power stage of the DC-DC converter and a filtered pulse width modulated signal (PWM) that drives the first power stage by filtering a voltage at a switching node of the first power stage;
a second differential voltage sensor to detect a second inductor current by sensing a second differential voltage between a second power stage of the DC-DC converter and a filtered pulse width modulated signal (PWM) that drives the second power stage by filtering a voltage at a switching node of the second power stage; and
an integrator stage to combine the first differential voltage from the first power stage and the second differential voltage from the second power stage to generate a compensation signal to adjust current balancing between a plurality of power stages so that the current through each power stage is substantially equal for the DC-DC converter wherein current through each power stage is measured via the $R_{DS}$ (ON) of transistors in the power stage.

2. The DC-DC converter of claim 1, wherein the DC-DC converter is configured as a step-up converter or as a step-down converter.

3. The DC-DC converter of claim 1, wherein the first differential voltage or the second differential voltage is sensed according to a voltage DeltaV that is about equal to $R_{DS}(ON)$ average * Iload_phase, wherein DeltaV is the average differential voltage across the first power stage or the second power stage, wherein $R_{DS}(ON)$ average is a time average impedance of the first power stage or the second power stage, and Iload_phase is the load current delivered by the first power stage or the second power stage.

4. The DC-DC converter of claim 3, further comprising a first filter at the output of the first power stage and a second filter at the output of the second power stage to filter the voltage DeltaV for the first power stage and DeltaV for the second power stage.

5. The DC-DC converter of claim 4, further comprising a first transconductance amplifier that generates a first output current representative of the voltage DeltaV for the first power stage and a second transconductance amplifier that generates a second output current representative of the voltage DeltaV for the second power stage.

6. The DC-DC converter of claim 5, further comprising a first comparator to generate a first pulse width modulated signal at an input to the first transconductance amplifier, the first pulse width modulated signal generated from a first phase clock and a first error signal applied to the first comparator, and a second comparator to generate a second pulse width modulated signal at an input to the second transconductance amplifier, the second pulse width modulated signal generated from a second phase clock and a second error signal applied to the second comparator.

7. The DC-DC converter of claim 5, further comprising an integrating capacitor to generate the compensation signal from the combined output of the first transconductance amplifier and the second transconductance amplifier, wherein the compensation signal represents current imbalances between phases of the DC-DC converter.

8. The DC-DC converter of claim 7, further comprising a third transconductance amplifier that generates phase adjustment signals from the compensation signal and a reference voltage applied to an input of the third transconductance amplifier, wherein the phase adjustment signals are employed to adjust current imbalances in the DC-DC converter.

9. A method, comprising:
generating a first output current based on a first differential voltage from a first power stage that drives a first inductor of a DC-DC converter, wherein the first differential voltage between an $R_{DS}(ON)$ of a transistor in the first power stage representative of average current flowing though the first inductor and a filtered pulse width modulated signal (PWM) that drives the first power stage;
generating a second output current based on a second differential voltage from a second power stage that drives a second inductor of the DC-DC converter, wherein the second differential voltage between an $R_{DS}(ON)$ of a transistor in the second power stage representative of average current flowing though the second inductor and a filtered pulse width modulated signal (PWM) that drives the second power stage; and
integrating the first output current and second output current into a compensation signal to adjust current balancing between a plurality of power stages in the DC-DC converter.

10. The method of claim 9, further comprising sensing the first differential voltage of the first power stage and the second differential voltage of the second power stage by monitoring an $R_{DS}(ON)$ value of switching transistors in the first and second power stages.

11. The method of claim 10, further comprising sensing the first differential voltage or the second differential voltage according to a voltage DeltaV that is about equal to $R_{DS}(ON)$ average * Iload_phase, wherein DeltaV is the average differential voltage across the first power stage or the second power stage, wherein RDS ON $R_{DS}(ON)$ average is a time average impedance of the first power stage or the second power stage, and Iload_phase is the load current delivered by the first power stage or the second power stage.

12. The method of claim 11, further comprising filtering the output of the first power stage and the output of the second power stage to filter the voltage DeltaV for the first power stage and DeltaV for the second power stage.

13. The method of claim 12, further comprising generating a first output current representative of the voltage DeltaV for the first power stage and a second a second output current representative of the voltage DeltaV for the second power stage.

14. A DC-DC converter, comprising:
a first differential voltage sensor to detect a first inductor current by sensing a first differential voltage between an $R_{DS}(ON)$ of a transistor in a first power stage of the DC-DC converter and a filtered pulse width modulated signal (PWM) that drives the first power stage;
a first transconductance amplifier that receives the first differential voltage as input and generates a first output current that represents the first differential voltage across the first power stage of the DC-DC converter;
a second differential voltage sensor to detect a second inductor current by sensing a second differential voltage an $R_{DS}(ON)$ of a transistor in a second power stage of the DC-DC converter and a filtered pulse width modulated signal (PWM) that drives the second power stage;

a second transconductance amplifier that receives the second differential voltage as input and generates a second output current that represents the second differential voltage across the second power stage of the DC-DC converter; and an integrator stage to combine the first output current from the first transconductance amplifier and the second output current from the second transconductance amplifier to generate a compensation signal to adjust current balancing a plurality of power stages of the DC-DC converter.

15. The DC-DC converter of claim 14, wherein the DC-DC converter is configured as a step-up converter or as a step-down converter.

16. The DC-DC converter of claim 14, wherein the first differential voltage and the second differential voltage are sensed according to a voltage DeltaV, wherein DeltaV is about equal to $RD_{DS}(ON)$ average * Iload_phase.

17. The DC-DC converter of claim 16, further comprising a first filter at the output of the first power stage and a second filter at the output of the second power stage to filter the voltage DeltaV for the first power stage and DeltaV for the second power stage.

* * * * *